United States Patent
Wijaya et al.

(10) Patent No.: US 12,442,424 B2
(45) Date of Patent: Oct. 14, 2025

(54) APPARATUS FOR PROCESSING A PLURALITY OF BRAKE WEAR SIGNALS FROM A CORRESPONDING PLURALITY OF BRAKE WEAR SENSORS OF A VEHICLE BRAKE SYSTEM AND METHOD THEREFOR

(71) Applicant: Bendix Commercial Vehicle Systems LLC, Avon, OH (US)

(72) Inventors: Tandi Wijaya, Highland Heights, OH (US); Michael D. Cremona, Lakewood, OH (US); Thomas J. Hayes, Lakewood, OH (US); Khaja Sharfuddin Mohammed, Bellingham, WA (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 269 days.

(21) Appl. No.: 18/056,047

(22) Filed: Nov. 16, 2022

(65) Prior Publication Data

US 2024/0159286 A1    May 16, 2024

(51) Int. Cl.
*F16D 66/02* (2006.01)
*B60T 17/22* (2006.01)
*F16D 66/00* (2006.01)

(52) U.S. Cl.
CPC ............ *F16D 66/026* (2013.01); *B60T 17/22* (2013.01); *F16D 2066/006* (2013.01)

(58) Field of Classification Search
CPC ... F16D 66/026; F16D 2066/006; B60T 17/22
See application file for complete search history.

(56) References Cited

U.S. PATENT DOCUMENTS

| | | | | |
|---|---|---|---|---|
| 11,720,862 | B2 * | 8/2023 | Dagley | G06Q 10/20 |
| | | | | 705/7.33 |
| 2003/0216849 | A1 * | 11/2003 | Eckert | B60T 8/885 |
| | | | | 701/90 |
| 2010/0283595 | A1 | 11/2010 | Korecki et al. | |
| 2015/0025735 | A1 * | 1/2015 | Mylaraswamy | B64C 25/42 |
| | | | | 701/32.9 |
| 2020/0309217 | A1 * | 10/2020 | Ruiz | F16D 66/027 |
| 2023/0406273 | A1 * | 12/2023 | Love | B60T 17/221 |
| 2023/0406281 | A1 * | 12/2023 | LeVesque | B60T 17/22 |

FOREIGN PATENT DOCUMENTS

EP        0357922 A2    3/1990

* cited by examiner

*Primary Examiner* — Richard M Camby
(74) *Attorney, Agent, or Firm* — Geoffrey A. Kudlo; Brian E. Kondas; Cheryl L. Greenly

(57) ABSTRACT

An apparatus is provided for processing a plurality of brake wear signals from a corresponding plurality of brake wear sensors of a vehicle brake system. The apparatus comprises an interfacing device arranged to receive the plurality of brake wear signals corresponding to the plurality of brake wear sensors of the vehicle brake system. The apparatus also comprises a controller arranged to control the interfacing device to provide a location signal indicative of which one of the plurality of brake wear sensors is providing a brake wear signal indicative of a worn brake.

18 Claims, 4 Drawing Sheets

APPARATUS FOR PROCESSING A PLURALITY OF BRAKE WEAR SIGNALS FROM A CORRESPONDING PLURALITY OF BRAKE WEAR SENSORS OF A VEHICLE BRAKE SYSTEM AND METHOD THEREFOR

BACKGROUND

The present application relates to vehicle brake wear sensors, and is particularly directed to an apparatus for processing a plurality of brake wear signals from a corresponding plurality of brake wear sensors of a vehicle brake system, such as a brake system of a heavy vehicle (e.g., a truck), and method therefor.

One type of vehicle brake wear sensor is a switch-based sensor that provides a digital signal indicative of whether the associated brake is worn (i.e., the digital signal is in one binary state) or not worn (i.e., the digital signal is in the other binary state). Another type of vehicle brake wear sensor is a potentiometer-based sensor that provides an analog signal indicative of the extent of wear of the associated brake. When the extent of wear reaches a certain level, the associated brake is deemed to be worn and needs to be replaced. A typical vehicle has a number of brake wear sensors installed and a system that monitors and processes signals from the brake wear sensors. A drawback of known monitoring and processing systems is that a worn brake signal is provided when one of the brake wear sensors indicates a worn brake, but the worn brake signal does not include any information about which brake wear sensor is providing the worn brake signal. Accordingly, those skilled in the art continue with research and development efforts in the field of vehicle brake wear sensors.

SUMMARY

In accordance with one embodiment, an apparatus is provided for processing a plurality of brake wear signals from a corresponding plurality of brake wear sensors of a vehicle brake system. The apparatus comprises an interfacing device arranged to receive the plurality of brake wear signals corresponding to the plurality of brake wear sensors of the vehicle brake system. The apparatus also comprises a controller arranged to control the interfacing device to provide a location signal indicative of which one of the plurality of brake wear sensors is providing a brake wear signal indicative of a worn brake.

In accordance with another embodiment, an apparatus is provided for a vehicle brake system. The apparatus comprises a plurality of brake wear sensors providing a corresponding plurality of brake wear signals. The apparatus also comprises an interfacing device arranged to process the plurality of brake wear signals to provide a stream of signals. The apparatus further comprises a controller arranged to (i) process the stream of signals to determine which one of the plurality of brake wear sensors is providing a brake wear signal indicative of a worn brake, and (ii) provide a location signal indicative of location of the one brake wear sensor providing the brake wear signal and thereby indicative of location of the worn brake of the vehicle brake system.

In accordance with yet another embodiment, an apparatus is provided for a vehicle brake system. The apparatus comprises a plurality of brake wear sensors for providing a corresponding plurality of brake wear signals indicative of extent of brake wear of the corresponding brake wear sensor. The apparatus also comprises means for retrofitting a vehicle brake system to be capable of handling and processing all of the plurality of brake wear signals to provide a location signal indicative of location of a worn brake of the vehicle brake system.

In accordance with still another embodiment, a method is provided of processing a plurality of brake wear signals from a corresponding plurality of brake wear sensors of a vehicle brake system to provide a location signal indicative of location of a worn brake of the vehicle brake system when a brake wear signal from one of the plurality of brake wear signals is indicative of the worn brake. The method comprises processing the plurality of brake wear signals to provide a stream of signals. The method also comprises determining which one of the plurality of brake wear sensors is providing the brake wear signal indicative of the worn brake based upon the stream of signals. The method further comprises providing the location signal indicative of location of the worn brake based upon the determination of which one of the plurality of brake wear sensors is providing the brake wear signal indicative of the worn brake.

DETAILED DESCRIPTION

The present application is directed to an apparatus for processing a plurality of brake wear signals from a corresponding plurality of brake wear sensors of a vehicle brake system, such as a brake system of a heavy vehicle (e.g., a truck). The specific construction of the apparatus and the industry in which the apparatus is implemented may vary. It is to be understood that the disclosure below provides a number of embodiments or examples for implementing different features of various embodiments. Specific examples of components and arrangements are described to simplify the present disclosure. These are merely examples and are not intended to be limiting.

Figure 1:
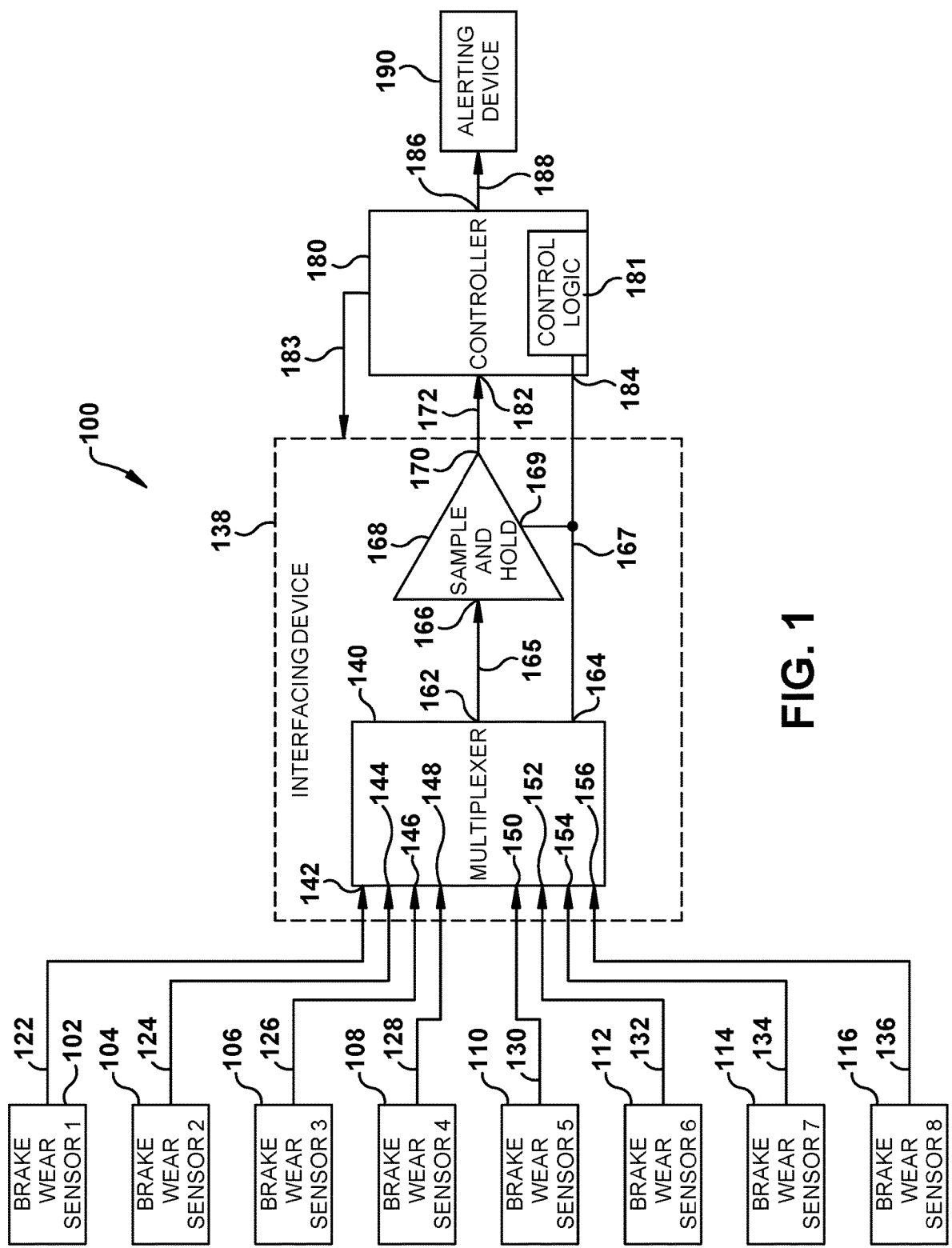
FIG. 1 is a block diagram of an example apparatus for processing a plurality of brake wear signals from a corresponding plurality of brake wear sensors of a vehicle brake system, and constructed in accordance with an embodiment.

Referring to FIG. 1, a block diagram of an example apparatus 100 for processing a plurality of brake wear sensors 102, 104, 106, 108, 110, 112, 114, 116 of a vehicle brake system, and constructed in accordance with an embodiment is illustrated. Although the number of the plurality of brake wear sensors shown in FIG. 1 is eight, it is conceivable that the number may comprise any plurality of brake wear sensors. The plurality of brake wear sensors 102, 104, 106, 108, 110, 112, 114, 116 provide a corresponding plurality of brake wear signals on electrical lines 122, 124, 126, 128, 130, 132, 134, 136, respectively.

Each of the plurality of brake wear sensors 102, 104, 106, 108, 110, 112, 114, 116 comprises an analog-type of brake wear sensor, such as a potentiometer-based sensor. Each of the sensors 102, 104, 106, 108, 110, 112, 114, 116 may comprise a potentiometer having a resistive element whose resistance varies in response to rotation of a component in an adjustment mechanism, or a slide potentiometer whose resistance varies in response to linear motion of a component in an adjustment mechanism. Such sensors are conventional and an exemplary sensor is shown in U.S. Pat. No. 11,215,252 B2, the entire disclosure of which is incorporated herein by reference. It is conceivable that each of the sensors 102, 104, 106, 108, 110, 112, 114, 116 may comprise other forms such as a Hall effect sensor, an encoder or resolver. The sensors generate data signals and transmit the signals.

Each of the plurality of brake wear signals 122, 124, 126, 128, 130, 132, 134, 136 may comprise a signal indicative of extent of wear of a corresponding brake pad. Alternatively, each of the plurality of brake wear signals 122, 124, 126, 128, 130, 132, 134, 136 may comprise a signal indicative of extent of wear of a corresponding brake rotor. It is conceivable that each of the plurality of brake wear signals 122, 124, 126, 128, 130, 132, 134, 136 comprise a signal indicative of both an extent of wear of a brake pad and an extent of wear of a brake rotor. A type of sensor, such as a potentiometer having a resistive element whose resistance varies in response to linear motion of a component in the adjustment mechanism disclosed hereinabove, may be used to measure the wear for both the brake pad(s) and the brake rotor. It is also conceivable that each of the plurality of brake wear signals 122, 124, 126, 128, 130, 132, 134, 136 comprise a signal indicative of wear of a vehicle brake component that is other than a brake pad or a brake rotor.

Each of the plurality of brake wear signals 122, 124, 126, 128, 130, 132, 134, 136 can represent extent of a corresponding worn brake in different ways. As an example, a brake wear signal of 100 percent may represent a new brake (i.e., new brake pad(s), new brake rotor, or both), while a brake wear signal of zero percent may represent a totally worn brake (i.e., totally worn brake pad(s), totally worn brake rotor, or both). Brake wear life may be defined as the sum of the remaining material left on the brake pad(s) and the remaining material left on the brake rotor.

An interfacing device 138 includes a multiplexer 140 having at least a number of multiplexer input ports corresponding to the number of brake wear sensors of the vehicle brake system. Accordingly, in the embodiment of FIG. 1, eight multiplexer input ports 142, 144, 146, 148, 150, 152, 154, 156 are shown. The multiplexer 140 has two multiplexer output ports, a signal output port 162 and a reference port 164 (e.g. electrical ground). The signal output port 162 of the multiplexer 140 is connected on line 165 to an input port 166 of a sample-and-hold circuit 168. The reference port 164 of the multiplexer 140 is connected on line 167 to a reference port 169 of the sample-and-hold circuit 168.

The sample-and-hold circuit 168 cooperates with the multiplexer 140 to sample each of the plurality of brake wear signals on lines 122, 124, 126, 128, 130, 132, 134, 136 from of the plurality of brake wear sensors 102, 104, 106, 108, 110, 112, 114, 116, respectively, and to maintain each sampled brake wear signal at an output port 170 of the sample-and-hold circuit 168 for a predetermined amount of hold-time. As an example, the predetermined amount of hold-time may be one second for each sampled brake wear signal. Structure and operation of sample-and-hold circuits in conjunction with multiplexers are known and, therefore, will not be described.

A controller 180 receives on line 172 a stream of signals (i.e., the sampled brake wear signals on lines 122, 124, 126, 128, 130, 132, 134, 136) from the output port 170 of the sample-and-hold circuit 168. The controller 180 has only two input ports, a positive sensor input port 182 and a negative sensor input port 184 that is connected on line 167 to the reference port 164 of the multiplexer 140 and the reference port 169 of the sample-and-hold circuit 168. The controller 180 processes the stream of sampled brake wear signals to provide a location signal at its output port 186 on line 188 indicative of which one of the plurality of brake wear sensors 102, 104, 106, 108, 110, 112, 114, 116 is providing a brake wear signal indicative of a worn brake when that particular brake becomes sufficiently worn.

More specifically, the controller 180 executes program instructions of control logic 181 to control the interfacing device 138 on line 183 and to process the stream of brake wear sensor signals received on lines 122, 124, 126, 128, 130, 132, 134, 136 at the interfacing device 138 to determine which one of the plurality of brake wear sensors 102, 104, 106, 108, 110, 112, 114, 116 is providing a brake wear signal indicative of a worn brake when the one of the plurality of brake wear sensors becomes sufficiently worn. The controller 180 produces the location signal on line 188 indicative of the location of the one brake wear sensor providing the brake wear signal. The location signal on line 188 indicative of the location of the one brake wear sensor is thereby indicative of the location of the worn brake.

Since each of the plurality of brake wear sensors 102, 104, 106, 108, 110, 112, 114, 116 is an analog-type sensor such as a potentiometer-based sensor, each of the plurality of brake wear sensors provides a corresponding brake wear signal indicative of extent of brake wear of the corresponding brake when the brake wear signal is in a voltage range between a first voltage value indicative of zero brake wear and a second voltage value indicative of complete brake wear. Accordingly, the stream of signals comprises a stream of analog voltage output signals from the plurality of potentiometer-based sensors.

A voltage value associated with each one of the plurality of brake wear signals on lines 122, 124, 126, 128, 130, 132, 134, 136 may be compared to a predetermined voltage level in a voltage range (e.g., 1.0V to 4.0V) between a first voltage value and a second voltage value. In some embodiments, the first voltage value (e.g., 1.0V) may be indicative of zero brake wear and the second voltage value (e.g., 4.0V) may be indicative of complete brake wear. A voltage value outside of the voltage range may be indicative of a defective brake wear sensor or a short-circuit (e.g., a short to ground or a short to power supply).

Based upon comparison of each voltage value associated with each one of the plurality of brake wear signals on lines 122, 124, 126, 128, 130, 132, 134, 136 to the predetermined voltage level in the voltage range between the first and second voltage values, the controller 180 makes a determination as to which one of the plurality of brake wear sensors 102, 104, 106, 108, 110, 112, 114, 116 is providing the brake wear signal indicative of the worn brake.

The controller 180 also produces an alert signal on line 188 indicative of the one of the plurality of brake wear sensors 102, 104, 106, 108, 110, 112, 114, 116 being worn. The alert signal from the controller 180 may be directed to any combination of an audio device located in a vehicle driver compartment, a visual device located in a driver compartment, an electronic control unit of the vehicle, and a storage location for diagnostic trouble codes.

It should be apparent that the controller 180 is required to have only the two sensor input ports 182, 184 to process the stream of brake wear signals from the pair of multiplexer output ports 162, 164 to the controller 180. The required number of sensor input ports of the controller 180 is less than the number of brake wear sensors. As such, the interfacing device 138 is particularly suitable for retrofitting a vehicle brake system having a controller that does not have enough sensor input ports to process all of the plurality of brake wear signals to provide a location signal indicative of location of a worn brake of a vehicle brake system. After a retrofit installation, the retrofitted vehicle brake system is capable of processing all of the plurality of brake wear signals to provide a location signal indicative of the specific location of a worn brake.

Figure 2:
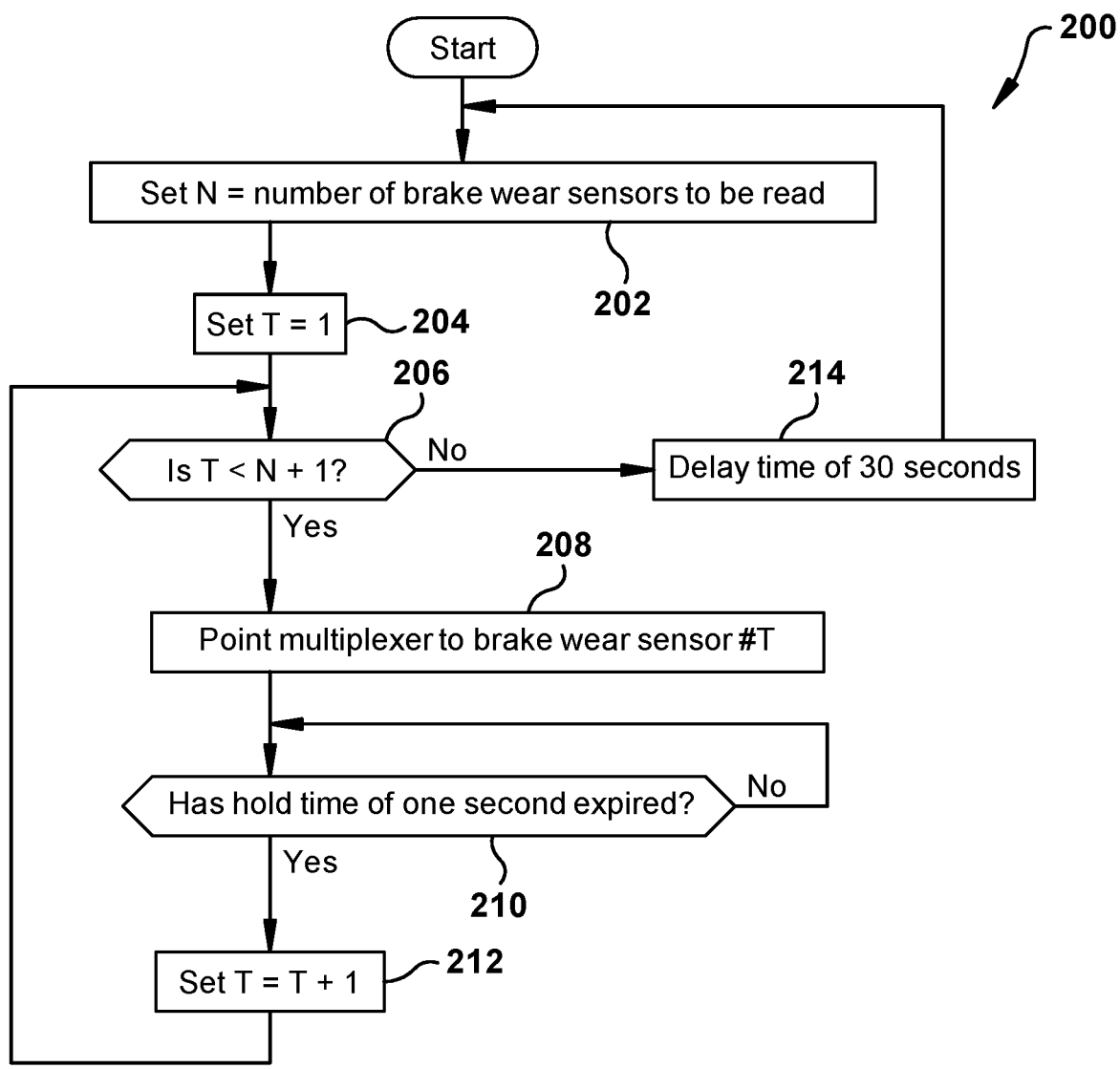
FIG. 2 is a flow diagram depicting an example method of operating an interfacing device of FIG. 1 in accordance with an embodiment.

Referring to FIG. 2, a flow diagram 200 depicts an example method of operating the interfacing device 138 of FIG. 1 in accordance with an embodiment. In block 202, a number "N" is set equal to the number of brake wear sensors of the vehicle brake system to be read. In block 204, a counter "T" is set equal to a value of one. In block 206, a determination is made as to whether the value of the counter T is less than a value of N+1.

When the determination in block 206 is affirmative (i.e., T<N+1), the proceeds to block 208 in which the controller 180 controls the multiplexer 140 to point to brake wear sensor number T. Also, as shown in block 210, the controller 180 controls the sample-and-hold circuit 168 to hold its output signal on line 172 for a first predetermined amount of time delay (e.g., one second) so that the controller 180 can read the brake wear signal of the corresponding brake wear sensor. After the brake wear signal is read, the process proceeds to block 212 in which the counter T is incremented by a value of one (i.e., T=T+1) before returning back to block 206 to repeat the processes of blocks 206, 208, 210 to read brake wear signals from the other brake wear sensors.

When the value of the counter T set in block 212 eventually reaches a value of N+1, the determination in block 206 becomes negative and the process proceeds to block 214. In block 214, a second predetermined amount of time delay (e.g., 30 seconds) is provided before returning back to block 202 to repeat a next cycle of reading brake wear signals from all of the plurality of brake wear sensors 102, 104, 106, 108, 110, 112, 114, 116.

Figure 3:
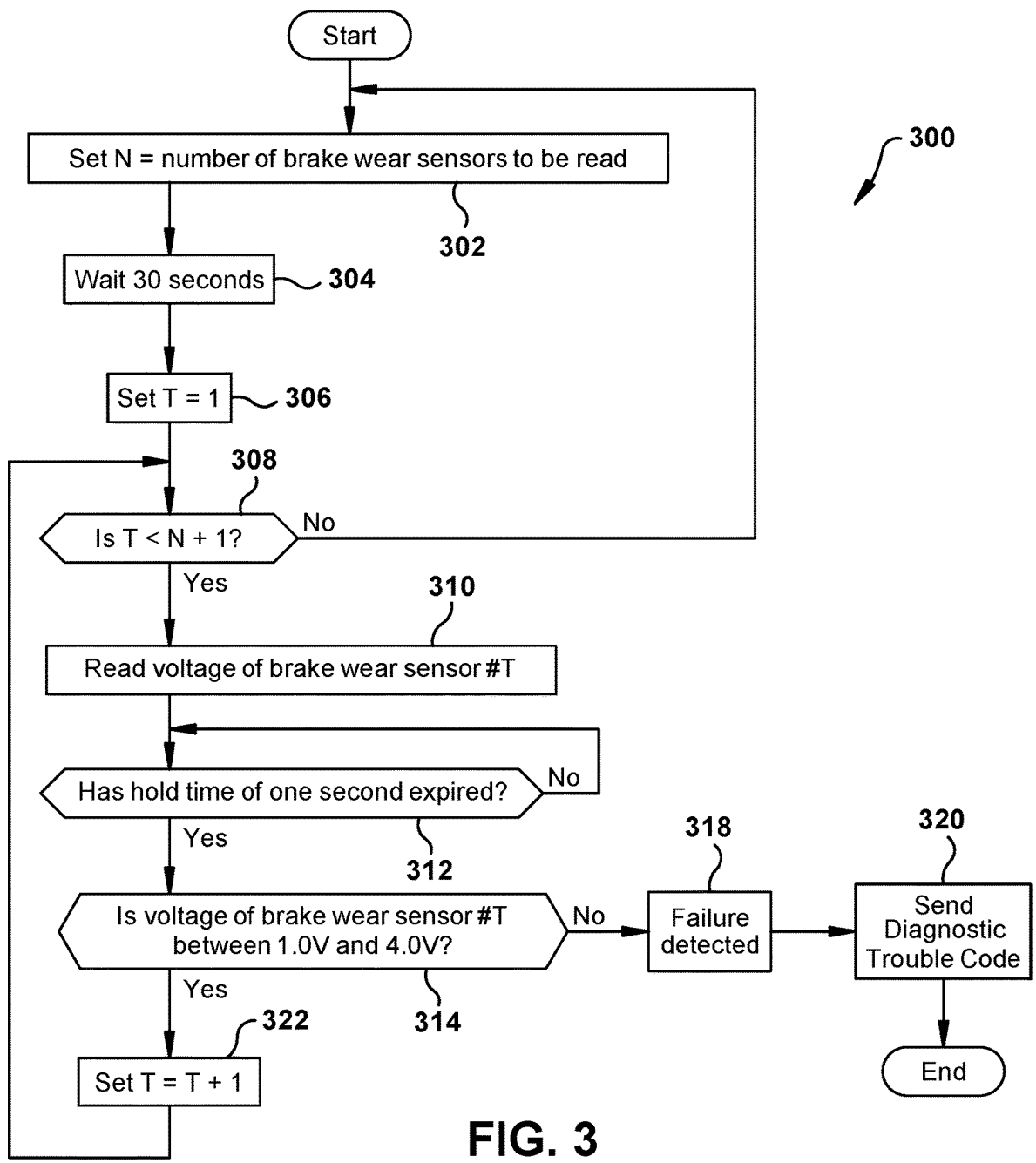
FIG. 3 is a flow diagram depicting an example method of operating a controller of FIG. 1 in accordance with an embodiment.

Referring to FIG. 3, a flow diagram 300 depicts an example method of operating the controller 180 of FIG. 1 in accordance with an embodiment. In block 302, a number "N" is set equal to the number of brake wear sensors of the vehicle brake system to be read. In block 304, a first predetermined time delay (e.g., 30 seconds) is provided before proceeding to block 306. In block 306, a counter "T" is set equal to a value of one. In block 308, a determination is made as to whether the value of the counter T is less than a value of N+1.

When the determination in block 308 is affirmative (i.e., T<N+1), the proceeds to block 310 in which the controller 180 processes the brake wear signal from brake wear sensor number T that appears on line 172 from the sample-and-hold circuit 168. In block 312, a second predetermined time delay (e.g., one second) is provided before proceeding to block 314.

In block 314, a determination is made as to whether the signal on line 172 from the sample-and-hold circuit 168 is between a predetermined voltage range (e.g., 1.0V and 4.0V). If the determination in block 314 is negative, the process proceeds to block 318 indicating that a brake wear sensor failure has occurred and then to block 320 to send a diagnostic trouble code indicative thereof. The process then ends.

However, if the determination in block 314 is affirmative, the process proceeds to block 322 in which the counter T is incremented by a value of one (i.e., T=T+1) before returning back to block 308 to repeat the processes of blocks 308, 310, 312, 314 to process brake wear signals from the other brake wear sensors.

When the value of the counter T set in block 322 eventually reaches a value of N+1, the determination in block 308 becomes negative and the process returns back to block 302 to repeat a next cycle of processing brake wear signals from all of the plurality of brake wear sensors.

Figure 4:
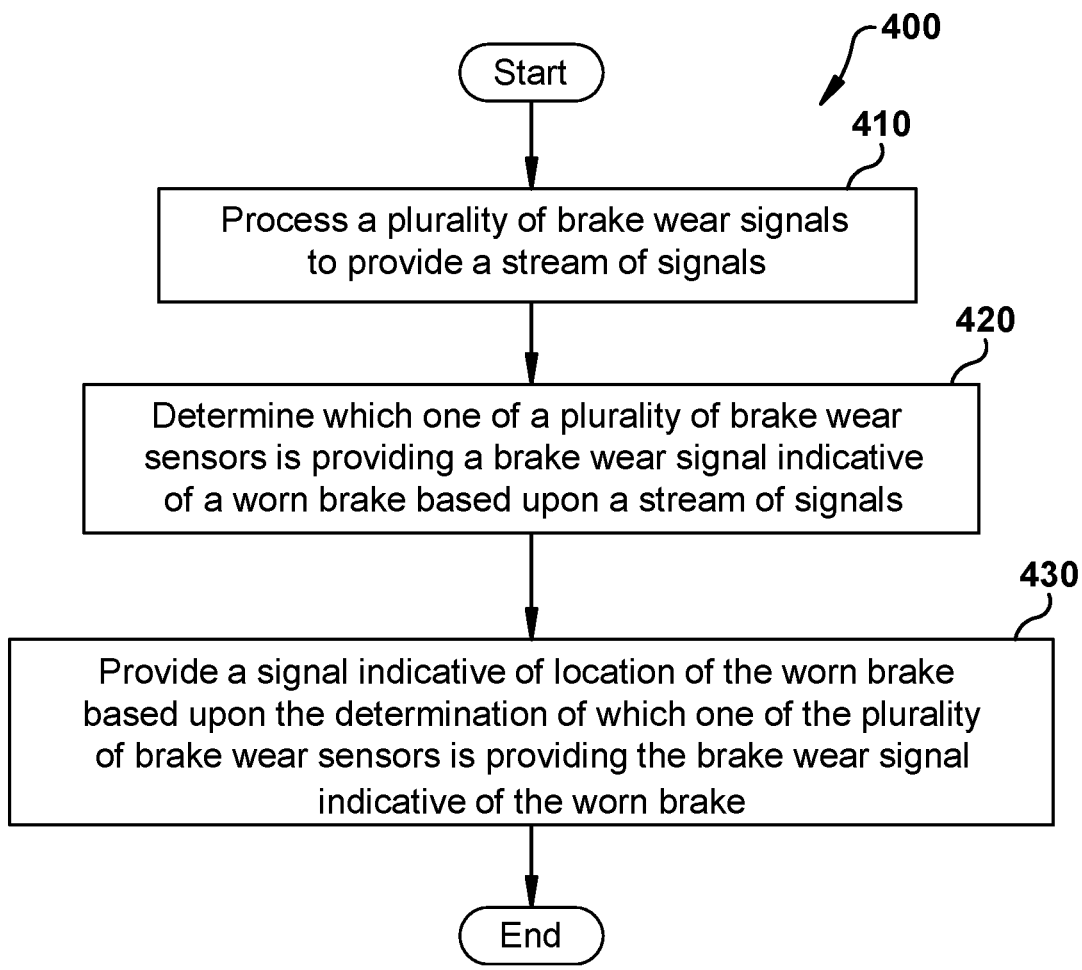
FIG. 4 is a flow diagram depicting example method of operating the apparatus of FIG. 1 in accordance with an embodiment.

Referring to FIG. 4, a flow diagram 400 depicts an example method of operating the apparatus 100 of FIG. 1 in accordance with an embodiment. In block 410, a plurality of brake wear signals are processed to provide a stream of signals. In block 420, a determination is made as to which one of a plurality of brake wear sensors is providing a brake wear signal indicative of a worn brake based upon the stream of signals. Then in block 430, a location signal is provided indicative of location of the worn brake based upon the determination of which one of the plurality of brake wear sensors is providing the brake wear signal indicative of the worn brake. The process then ends.

In some embodiments, a brake wear signal is indicative of extent of brake wear when the brake wear signal is in a voltage range between a first voltage value indicative of zero brake wear and a second voltage value indicative of complete brake wear.

In some embodiments, a voltage value associated with each one of the plurality of brake wear signals is compared to a predetermined voltage level in the voltage range between the first and second voltage values. A determination then made as to which one of the plurality of brake wear sensors is providing the brake wear signal indicative of the worn brake based upon comparison of each voltage value associated with each one of the plurality of brake wear signals to the predetermined voltage level in the voltage range between the first and second voltage values.

In some embodiments, a brake wear signal is indicative of a short-circuit or a defective brake wear sensor when the brake wear signal falls outside of the voltage range between the first voltage value indicative of zero brake wear and the second voltage value indicative of complete brake wear.

In some embodiments, the plurality of brake wear signals is multiplexed, and the multiplexed signals are sampled to provide the stream of signals.

A number of advantages are provided by the above-disclosed embodiments. One advantage is that a controller having only two sensor input ports can be used to process a plurality of brake wear signals from a corresponding plurality of brake wear sensors of a vehicle brake system. This reduces the amount of wiring needed to produce new vehicle brake systems, which results in labor savings as well as lower material cost during production.

Another advantage is that an existing, field-based vehicle brake system that uses a controller having only two sensor input ports can be easily retrofitted with an apparatus disclosed herein to provide the capability to process a plurality of brake wear signals from a corresponding plurality of brake wear sensors of the vehicle brake system. A full retrofit installation including controller programming can be implemented to retrofit specific vehicle brake systems of specific vehicles.

Still another advantage is that not only is an indication of a worn brake of a vehicle brake system provided, but an indication of the specific location of the worn brake is provided. This results in labor savings during servicing of the vehicle brake system to replace the worn brake.

Yet another advantage is that an extent of brake wear of each of a plurality of brakes of a vehicle brake system can be provided if each of the corresponding plurality of brake wear sensors is an analog-type of sensor, such as a potentiometer-based sensor.

Although the above description describes the controller 180, which is separate from the interfacing device 138, controlling components of the interfacing device 138, it is conceivable that the interfacing device 138 comprises at least in part the controller 180. It is also conceivable that the interfacing device 138 comprises the entire controller 180. It is further conceivable that the interfacing device 138 comprises at least a part another controller which is other than the controller 180 shown in FIG. 1.

Also, although the above description describes use of one electronic controller unit, it is conceivable that any number of electronic controller units may be used. Moreover, it is conceivable that any type of electronic controller unit may be used. Suitable electronic controller units for use in vehicles are known and, therefore, have not been described. Accordingly, program instructions (e.g., control logic 181 shown in FIG. 1) of the present disclosure can be stored on program storage media associated with one or more vehicle electronic controller units.

Further, although the above description describes the combination of the interfacing device 138 and the controller 180 being used in a vehicle brake system that has analog-type of brake wear sensors, it is conceivable that the combination be used in a vehicle brake system that has digital-type (i.e., switched-based) of brake wear sensors.

Although the above-description describes apparatus being used in a heavy vehicle such as a truck, it is conceivable that the apparatus disclosed herein may be used in other types of heavy vehicles, such as busses for example.

Program instructions for enabling a controller to perform operation steps may be embedded in memory internal to the controller. Alternatively, or in addition to, program instructions may be stored in memory external to the controller. As an example, program instructions may be stored in memory internal to a different electronic controller unit of the vehicle. Program instructions may be stored on any type of program storage media including, but not limited to, external hard drives, flash drives, and compact discs. Program instructions may be reprogrammed depending upon features of the particular electronic controller unit.

Aspects of disclosed embodiments may be implemented in software, hardware, firmware, or a combination thereof. The various elements, either individually or in combination, may be implemented as a computer program product tangibly embodied in a machine-readable storage device for execution by a computer processor. Various steps of embodiments may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed embodiments can be loaded onto a computer.

While the present invention has been illustrated by the description of example processes and components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. An apparatus for processing a plurality of brake wear signals from a corresponding plurality of brake wear sensors of a vehicle brake system, the apparatus comprising:
    an interfacing device, including a multiplexer having at least a number of multiplexer input ports corresponding to a number of the brake wear sensors of the vehicle brake system, arranged to receive the plurality of brake wear signals corresponding to the plurality of brake wear sensors of the vehicle brake system;
    a controller arranged to control the interfacing device to provide a location signal indicative of which one of the plurality of brake wear sensors is providing a brake wear signal indicative of a worn brake, the interfacing device including a sample-and-hold circuit that cooperates with the multiplexer to sample each brake wear signal of the plurality of brake wear sensors and to maintain each sampled brake wear signal for a sufficient amount of time so that the controller can process the sampled brake wear signal.

2. An apparatus according to claim 1, wherein each of the plurality of brake wear signals is indicative of extent of wear of a corresponding brake pad.

3. An apparatus according to claim 1, wherein each of the plurality of brake wear signals is indicative of extent of wear of a corresponding brake rotor.

4. An apparatus according to claim 1, wherein each of the plurality of brake wear signals is indicative of both extent of wear of a corresponding brake pad and extent of wear of a corresponding brake rotor.

5. An apparatus according to claim 1, wherein the controller is arranged to (i) process the plurality of brake wear signals received at the interfacing device to determine which one of the plurality of brake wear sensors is worn when the one of the plurality of brake wear sensors becomes sufficiently worn, and (ii) produce an alert signal indicative of the one of the plurality of brake wear sensors being worn.

6. An apparatus according to claim 5, wherein the alert signal from the controller is directed to any combination of an audio device located in a vehicle driver compartment, a visual device located in a driver compartment, an electronic control unit of the vehicle, and a storage location for diagnostic trouble codes.

7. An apparatus according to claim 1, wherein the multiplexer comprises a pair of multiplexer output ports that are connected to a pair of sensor input ports of the controller.

8. A retrofit kit comprising an apparatus of claim 1 and for retrofitting a vehicle brake system that has a number of brake wear sensors providing a corresponding number of brake wear signals and a controller that has a number of sensor input ports less than the number of brake wear signals.

9. An apparatus for a vehicle brake system, the apparatus comprising:
    a plurality of brake wear sensors providing a corresponding plurality of brake wear signals;
    an interfacing device, including a multiplexer having at least a number of multiplexer input ports corresponding to a number of the brake wear sensors of the vehicle brake system, arranged to process the plurality of brake wear signals to provide a stream of signals; and
    a controller arranged to (i) process the stream of signals to determine which one of the plurality of brake wear sensors is providing a brake wear signal indicative of a worn brake, and (ii) provide a location signal indicative of location of the one brake wear sensor providing the brake wear signal and thereby indicative of location of the worn brake of the vehicle brake system, the interfacing device including a sample-and-hold circuit that cooperates with the multiplexer to sample each brake wear signal of the plurality of brake wear sensors and to maintain each sampled brake wear signal for a sufficient amount of time so that the controller can process the sampled brake wear signal.

10. An apparatus according to claim 9, wherein (i) the plurality of brake wear sensors comprises a corresponding plurality of potentiometer-based sensors, and (ii) the stream of signals includes a stream of analog voltage output signals from the plurality of potentiometer-based sensors.

11. An apparatus according to claim 9, wherein the interfacing device comprises at least in part the controller.

12. An apparatus according to claim 9, wherein the interfacing device comprises at least in part another controller.

13. An apparatus for a vehicle brake system, the apparatus comprising:
a plurality of brake wear sensors for providing a corresponding plurality of brake wear signals indicative of extent of brake wear of the corresponding brake wear sensor; and
means for retrofitting a vehicle brake system to be capable of handling and processing all of the plurality of brake wear signals to provide a location signal indicative of location of a worn brake of the vehicle brake system, the retrofitting means including (i) a multiplexer having at least a number of multiplexer input ports corresponding to the number of brake wear sensors of the vehicle brake system, and (ii) a sample-and-hold circuit that cooperates with the multiplexer to sample each brake wear signal of the plurality of brake wear sensors and to maintain each sampled brake wear signal for a sufficient amount of time so that a controller can process the sampled brake wear signal.

14. An apparatus according to claim 13, wherein each of the plurality of brake wear sensors provides a corresponding brake wear signal indicative of extent of wear of a corresponding brake pad, a corresponding brake rotor, or both.

15. An apparatus according to claim 14, wherein each of the plurality of brake wear sensors comprises a potentiometer-based sensor.

16. A method of processing a plurality of brake wear signals from a corresponding plurality of brake wear sensors of a vehicle brake system to provide a location signal indicative of location of a worn brake of the vehicle brake system when a brake wear signal from one of the plurality of brake wear signals is indicative of the worn brake, the method comprising:
processing the plurality of brake wear signals to provide a stream of signals;
determining which one of the plurality of brake wear sensors is providing the brake wear signal indicative of the worn brake based upon the stream of signals, the brake wear signal being indicative of extent of brake wear when the brake wear signal is in a voltage range between a first voltage value indicative of zero brake wear and a second voltage value indicative of complete brake wear, including:
comparing a voltage value associated with each one of the plurality of brake wear signals to a predetermined voltage level in the voltage range between the first and second voltage values; and
determining which one of the plurality of brake wear sensors is providing the brake wear signal indicative of the worn brake based upon comparison of each voltage value associated with each one of the plurality of brake wear signals to the predetermined voltage level in the voltage range between the first and second voltage values; and
providing the location signal indicative of location of the worn brake based upon the determination of which one of the plurality of brake wear sensors is providing the brake wear signal indicative of the worn brake.

17. A method according to claim 16, wherein a brake wear signal is indicative of a short-circuit or a defective brake wear sensor when the brake wear signal falls outside of the voltage range between the first voltage value indicative of zero brake wear and the second voltage value indicative of complete brake wear.

18. A method according to claim 16, wherein processing the plurality of brake wear signals to provide a stream of signals includes:
multiplexing the plurality of brake wear signals; and
sampling the multiplexed signals to provide the stream of signals.

* * * * *